Dec. 21, 1965  G. A. R. ÖJELID  3,224,361
AUTOMAT FOR HEAT TREATMENT AND DELIVERY OF FOOD-STUFFS
Filed Feb. 21, 1962  5 Sheets-Sheet 1

Inventor
Göran Axel Runo Öjelid
By Cushman, Darby + Cushman
Attorneys

Dec. 21, 1965  G. A. R. ÖJELID  3,224,361
AUTOMAT FOR HEAT TREATMENT AND DELIVERY OF FOOD-STUFFS
Filed Feb. 21, 1962  5 Sheets-Sheet 2

Inventor
Goran Axel Runo Öjelid
By Cushman, Darby & Cushman
Attorneys

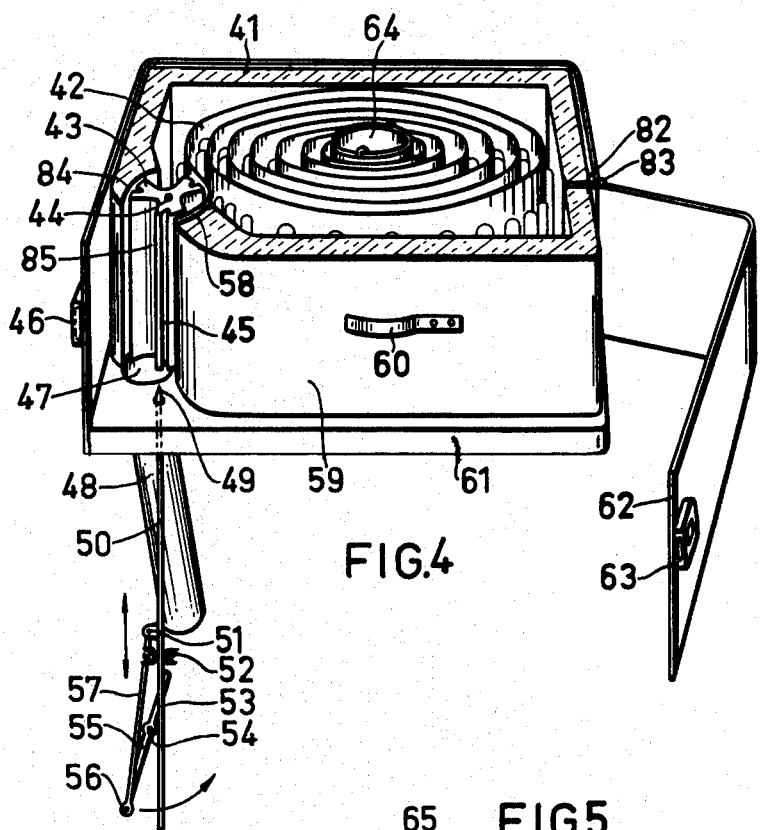
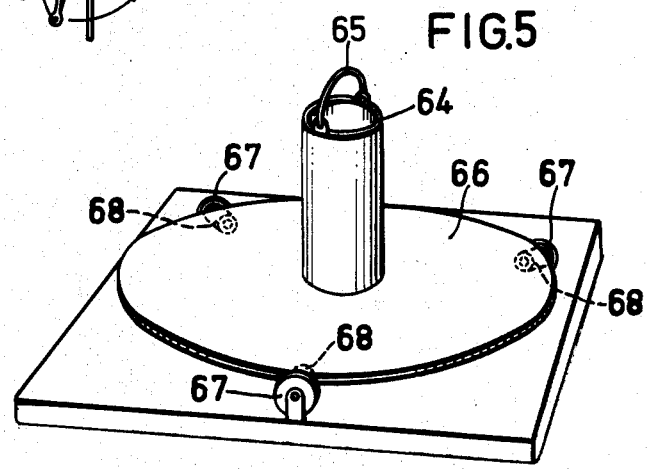

Dec. 21, 1965     G. A. R. ÖJELID     3,224,361
AUTOMAT FOR HEAT TREATMENT AND DELIVERY OF FOOD-STUFFS
Filed Feb. 21, 1962     5 Sheets-Sheet 5
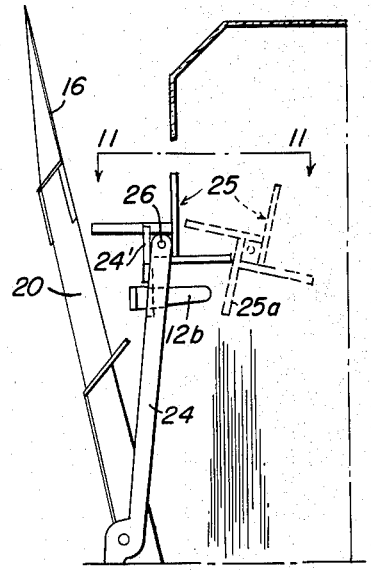
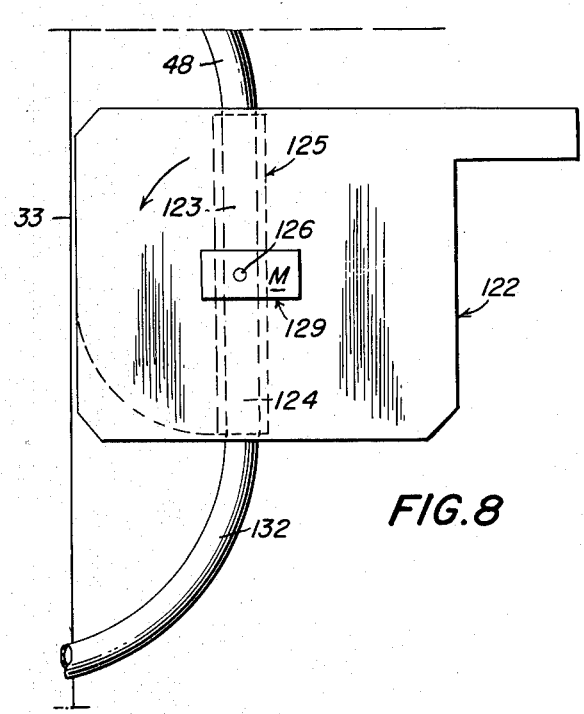
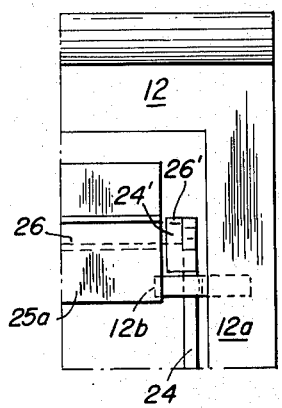
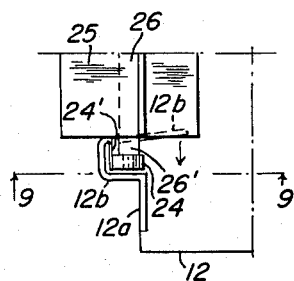
INVENTOR
GÖRAN AXEL RUNO ÖJELID
BY Cushman, Darby & Cushman
ATTORNEYS

3,224,361
AUTOMAT FOR HEAT TREATMENT AND DELIVERY OF FOOD-STUFFS
Göran Axel Runo Öjelid, Huskvarna, Sweden, assignor to Husqvarna Vapenfabriks Aktiebolag, Huskvarna, Sweden
Filed Feb. 21, 1962, Ser. No. 174,890
Claims priority, application Sweden, Feb. 25, 1961, 2,015/61; Mar. 13, 1961, 2,632/61
12 Claims. (Cl. 99—332)

This invention relates to an improved automat for heat treatment and delivery of articles of food, such as sausages. This automat is primarily characterized by the combination of a heat insulated container for a supply of articles, means for maintaining a substantially constant, comparatively low temperature in the container, an oven for successive heat treatment of said articles by micro-wave irradiation, a micro-wave generator of the electron tube type, preferably a magnetron, which is coupled to the oven, and electrically driven transporting means for removing the articles from the container, introducing them in the oven, removing them therefrom after a predetermined time, and delivery thereof at a manipulating side of a casing comprised in the automat, a switch for the filament current supply of said generator, a switch for said transporting means, said switches being closable through a manual operation, preferably the insertion of one or several coins in the automat, and a switch for the anode current supply of the generator, said last-mentioned switch being adapted to be closed through the engagement of said transporting means and to be opened automatically after a predetermined time. The cathode of the generator is preferably adapted, by means of a delay relay, to maintain operating temperature during a certain time, suitably 2-5 minutes, after each delivery.

The invention will be more particularly described in the following, reference being had to the accompanying drawings, which by way of examples and diagrammatically represent some embodiments of the automat.

FIG. 4 is a perspective view of a second embodiment of the heat insulating container and its feeding out means, partly in section.

FIG. 5 is a perspective view of a bottom portion of this container.

FIG. 8 is a side view of an oven modified for operation with the FIGS. 4 and 6 feeding embodiments.

FIG. 9 is a partial vertical section similar to FIG. 1 but taken along line 9—9 of FIG. 11.

FIG. 10 is a partial front view of the FIGS. 1 and 9 embodiment.

FIG. 11 is a partial horizontal sectional view taken along the line 11—11 of FIG. 9.

Figure 1:
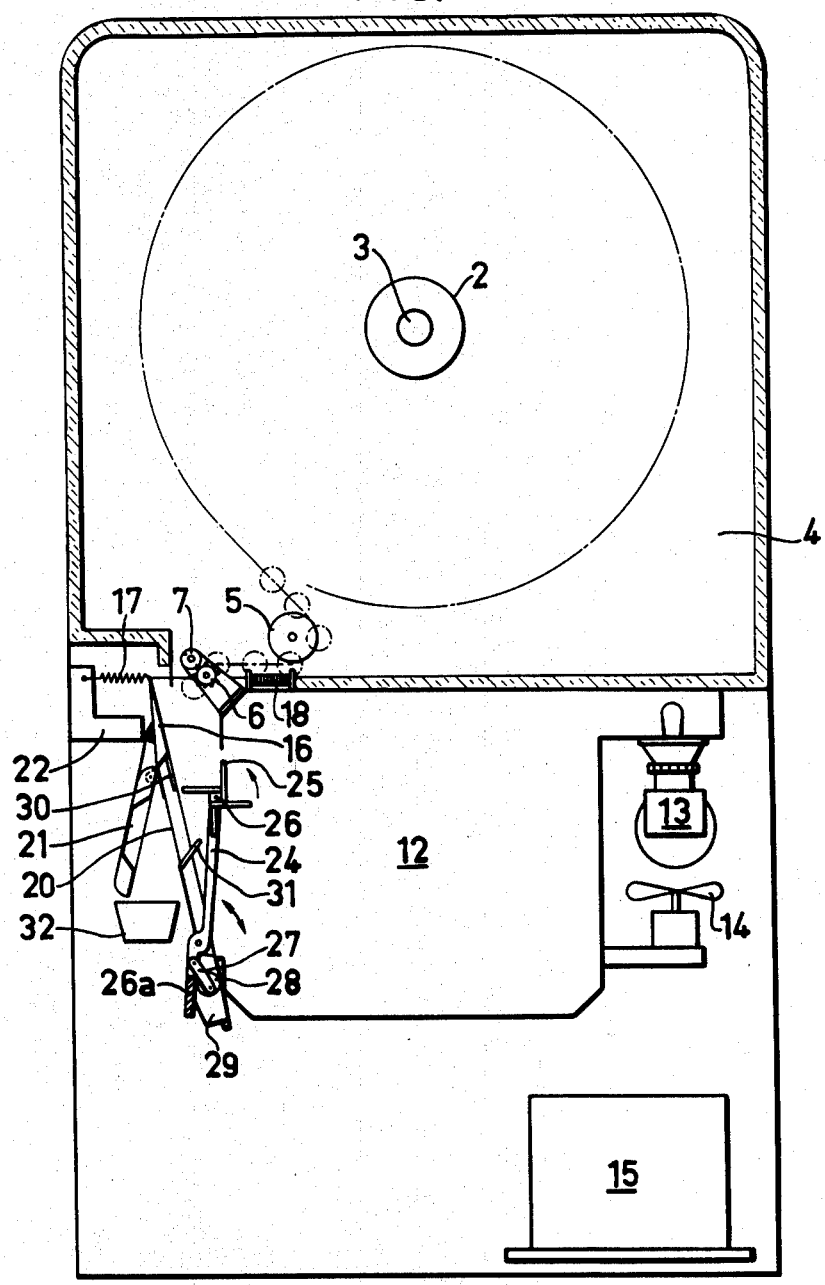
FIG. 1 is a vertical section through a first embodiment of the invention.
Figure 2:
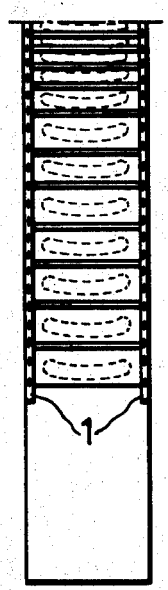
FIG. 2 illustrates a portion of a tape or belt of article packets.

In the embodiments shown, the article or commodity, e.g., a sausage, is packed by pieces and wrapped by a foil of plastics. The ends of the individual packets are united by means of two parallelly extending, perforated tapes 1 of tough cardboard or the like, as shown in FIG. 2. If the tapes are made about 10 meters long, about 200 packets of this kind may be contained between them, which is a suitable quantity. In order to enable easy handling thereof, this packet assembly with the length of 10 meters is wrapped around a drum 2 (FIG. 1) which may be attached from in front to a flying, horizontal axle 3, as shown in FIG. 1. The axle 3 is located in the upper portion of the automat within an adequately insulated chamber 4, the temperature of which is maintained at approximately +4° C. with the aid of a thermostat and cooling and heating elements.

Figure 3:
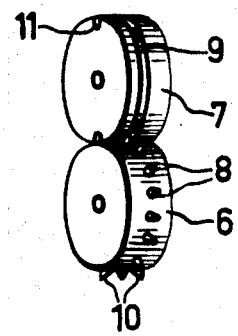
FIG. 3 shows a pair of wheels for advancing the tape.

From drum 2 the tape-like packet assembly is conducted over an idle roller 5 to a feeding means which consists of two pairs of wheels 6 and 7, one pair of which is shown in FIG. 3. The circumference of the lower wheel 6 of each pair is provided with radial teeth 8 in agreement with the pitch or spacing between the individual perforations of the tape 1, and the upper wheel 7 has a circumferential groove 9, which may receive the teeth 8. Wheels 6 are adapted to be driven by means of an electric motor (M1 in FIG. 7), and wheels 7 are synchronized with them, e.g., by means of a gearing. The synchronization is necessary, since wheels 6 also carry knives 10 cooperating with radial slots 11 in wheels 7 for cutting off a perforated tape 1 passing between the wheels.

Immediately below chamber 4 there is provided an oven 12 for heat treatment of the article through dielectric influence from an alternating current field of high frequency. Oven 12, in wihch the articles are thus subjected to micro-wave radiation, is connected to a high frequency generator 13 with a cooling fan or blower 14, and below the blower a voltage unit 15 for the generator is located. This high frequency or micro-wave generator is preferably a magnetron. Oven 12 is also provided with a door 16 which is pivoted in its lower portion and prevents radiation outwards from the high frequency field. The door is represented in its open position in FIG. 1, to which position it is biased by a spring 17. A pull magnet 18 is adapted to shut the door 16 when fed with current. In door 16 an opening 20 is provided, which is adapted to be closed by a second, smaller door 21, which is pivoted in its upper portion and also acts as a screen or seal for the high frequency field. When door 16 is opened, door 21 is opened too through its getting into contact with a stationary stop member 22. In addition thereto, two arms 24 are pivoted in the lower portion of door 16. They carry a shelf 25 of a special kind. Shelf 25 has four planes which extend outwardly from a horizontal axle 26 journalled in arms 24. Between arms 24 and shelf 25 there are provided such means, known per se, as cams, for example the square axle portions 26' (FIGS. 8–10) that on the outer one of their four faces cooperate with respective leaf springs 24' secured to arms 24 respectively, and which resiliently fix the shelf in any of those four positions which correspond to FIG. 1 and in which two planes are horizontal. Arms 24 as well as shelf 25 and the cams or the like are made of non-metallic material which is not influenced by the alternating current field in question. Arms 24 are pivoted just where they penetrate the door 16 in slots, and they have such a configuration that the slots may have a minimum length. Outside the door 16 arms 24 are interconnected by means of a counterbalance 26a and are through a lever or link 27 coupled to an eccentric 28 of an electric motor 29 (M3 in FIG. 7) carried by the door 16. At opposite sides of opening 20 guide rails 30 and 31 respectively are provided, which are suitably made of the same material as shelf 25. Below the smaller door 21 a cup or channel 32 is provided which is suitably inclined considerably in a vertical plane.

As shown in FIGS. 9–11, a resilient bill or finger 12b is secured on the inner face of a lateral edge 12a of the part of the oven forming the opening for door 16, preferably one at each end of the door but only one such bill is illustrated. The purpose of such bills is to cause shelf 25 to rotate counterclockwise, as viewed in FIGS. 1 and 9, when door 16 opens, such rotation being limited to a quarter revolution because of the above described leaf spring 24' and cam 26' arrangement. In FIG. 9, the dashed line showing of shelf 25 indicates its position when door 16 is closed. Since the inner resilient leg of bill 12b protrudes in the pathway of the downwardly projecting shelf wing 25a as it moves inward during the closing of door 20, the shelf wing forces that leg outwardly (in the direction of the arrow shown in FIG. 11) until the leg passes the bill, at which time the bill springs back to its normal position shown in FIG. 11. Then, when door 16 opens in the manner explained below, shelf wing 25a comes in contact with the end of the leg of bill 12a and since the latter is stationary in the outward direction of door and shelf movement, the shelf rotates counterclockwise until its wing 25a is out of the way of the bill. The leaf springs 24' and square axle cams 26' cause the shelf then to rotate the rest of the quarter revolution and stop with the leaf springs on the faces of the cams that were previously facing upwardly.

The mode of operation is the following:

When the automat is started by the insertion of a coin or in another way, the position is as represented in FIG. 1. Upon starting, the pairs of wheels 6 and 7 are rotated and their knives 10 cut off the tape 1, so that the foremost packet will fall freely downwards between the oven 12 and the open door 16 and is received upon the shelf 25. During their movement the wheels 6 thereafter close an electric contact (not shown) which results in the shutting of door 16 by magnet 18 which event in turns results in the shutting of door 21 and the starting of motor 29. When closing door 16, magnet 18 also actuates an electric contact, not shown here, by means of which generator 13 is started, and for the magnet 18 there is established a holding circuit which extends through a switch, opened once every revolution. In the position thus established during the course of approximately one second, a packet will rest upon the shelf 25 inside the closed door 16, generator 13 is operating and shelf 25 is moving through the field produced by the generator, since arms 24 are connected to eccentric 28. Wheels 6 continue their feed movement and thereby cause a new packet to occupy its starting position, and then their driving motor will be stopped again by the said contact controlled by wheel 6. However, magnet 18 remains energized by its holding circuit, until eccentric 28 has completed a full revolution, which corresponds to a time of treatment in the alternating field, which is suitable for the article in the packet. When the current through magnet 18 is interrupted, spring 17 opens door 16, which results in the stopping of generator 13 and the opening of door 21. The movement of door 16, however, also brings about the rotation of shelf 25 a quarter of a revolution in the direction of the arrow, its lower portion hereby being actuated by a pair of somewhat resilient bills or fingers provided in the oven, as previously described in connection with bill 12b in FIGS. 8–10. The packet and its contents is thereby turned downwards through opening 20 and is received in channel 32, which on account of its slope conducts it to a suitable opening in the manipulating side of the automat.

Shelf 25 may extend through the entire depth of oven 12, which suitably is about 600 mm., which means that several drums 2 may be arranged beside each other upon the axle 3, each drum being provided with packed articles of a specific kind. In this instance each drum is associated with an individual feed means having a motor, so that directing the start impulse to a certain motor also means the selection of an article of a definite kind. This will be more explicity described later with reference to FIG. 7. The rest of the apparatus is common and unchanged. Through this expedient three different kinds of articles may easily be available.

Generator 13 is preferably arranged for instantaneous start only at such times as the apparatus is frequently utilized. Since only generators of the electron tube type, preferably magnetrons, are contemplated, this means that the cathode of the generator is adapted, by means of a delay relay, to maintain its full operating temperature during 2–3 minutes after each delivery. When the pauses are longer, the cathode assumes a lower temperature which does not cause wearing out thereof, and it is then heated for 5–10 seconds before the course of events commences in accordance with the above. How this can be attained will also be described with reference to FIG. 7.

Figure 6:
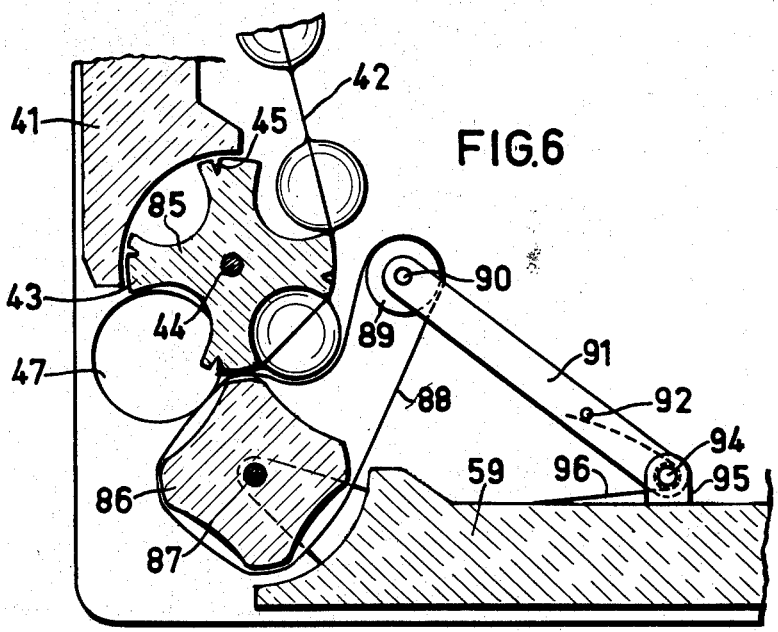
FIG. 6 represents a modification of the feeding out means on a larger scale and in horizontal section.

When the articles or their packets which are preferably hermetically sealed, are united or interconnected to form a tape, this may, in the container, be arranged in zigzag in superimposed layers, the upper one of which is coupled to the transport means. When the tapes or belts are arranged in reels, each tape reel may rest upon an endless belt, preferably of fabric reinforced rubber, which runs around two easily rotatable rollers. The tape reels may also, to advantage, be arranged on a vertical axle. Some embodiments of this kind are shown in FIGS. 4–6.

In FIG. 4, 41 designates a container of heat insulating material with a door 59 of the same material, which is, at its one end, secured to a hinge 82 and with its opposite end 58 together with the rim 84 of the container partly embraces a feed roller 43 of heat insulating material which is provided with an axial slot 45. Possible heating and cooling elements are suitably located below the ceiling (not shown) of the container or on the bottom thereof respectively, and thermostatically controlled. The articles are as before packed serially in a continuous tape 42 which is coiled on a round plate 66 (FIG. 5) around a cylindrical central portion 64 secured to the plate 66 and provided with a carrying handle 65. The feed, which in coin automats is initiated in a manner known per se by a contact actuated by a coin, operates in such a manner, that an electric motor through a transmission provided with a travel limiter rotates the feed roller 43 a third of a revolution, after which the transmission of the electric motor, when the travel limiter is a mechanical one, immediately after having disconnected the axle 44 of the feed roller 43, is switched over to the axle 54 of the cutting off device which is rotates one revolution controlled by another travel limiter, which in addition to that interrupts the current supply to the electric motor. During the rotation of axle 54 an arm 55 secured thereto will, through a link 57 during the first half of the revolution, push a rod 50 with a knife 49 upwards, so that it, guided by its upper portion in plate 61 and in its lower portion 53 in a guide 52, will move the knife 49 through the slot 45 in the feed roller 43, so that the portion just advanced will be cut loose and will fall down into the opening 47 and into said oven through the tube 48.

During the second half of the revolution rod 50 is retracted to its initial position, the knife 49 again following the slot 45 and ensuring the detaching of the portion from the tape.

According to FIG. 5 the plate 66 upon which the packet tape reel rests may be made easily rotatable by being carried by rolls 68 with guiding flanges 67 and radially extending axes. This arrangement also facilitates the disposing of a plurality of packet reels, preferably of different contents, above each other, the radially extending axes of which suitably may be attached to the walls of the container. When portions of different diameters are contemplated, that feeding means with its associated magazine which is intended for the biggest portions must be located at the bottom since the portions of the other "floors" will have to pass the feeding means of the lower floors.

FIG. 6 shows an embodiment of the feed means which comprises a feed roller 43 with four arms, and a pressure roller 86 which is journalled on the door 59 (compare FIG. 4) but embraced by an elastic, tightened tape 88 of rubber impregnated fabric or the like which holds the portion in its position and also embraces the tightening roller 89 which is biased by a spring 96 through an arm 91. The portion being advanced will on account hereof be adequately held in its position in the feed roller, and in addition to that, the tape will, during the cutting operation, be held tightly pressed between the feed roller and the pressure roller.

The FIG. 4 metal tube 48 which leads from opening 47 in FIGS. 4 and 6 may be directly connected to the ceiling of the micro-wave oven 122 as shown in FIG. 8, and may, if the size of the articles permits, be so long and narrow, that it forms a leakage shield against the micro-wave energy. In other instances, the tube may be provided with a high-frequency shielding door or flap which is opened and closed by an electric motor or electromagnet or through the weight of the articles or a comparatively weak spring. In the oven the article may be caught in the one of two diametrically opposite pockets 123 and 124 of a rotatable transport means 125 of non-metallic material which corresponds to the assembly 24–26 in FIG. 1 and is not influenced by the alternating current field and which will subsequently be started in rotation about axis 126 by motor 129, and, after a suitable running and heat treatment time will stop and eject the article through a downwards extending tube 132 of about the same design as tube 48 and leading to an opening at the manipulating side 33 of the automat.

Particularly if the container is located below the oven, it may to advantage be entirely or in part removable from the automat in order to enable filling in another place. In this instance, e.g., the rear side wall of the container may be separate and stationarily arranged somewhat spaced from the corresponding wall of the casing of the container in order to form, together with this wall, a cooling aid duct with a condenser, and may carry on its inner side an evaporator, which is connected to a compressor under the container. The remaining transportable portion of the container which is, during transport, closed by a specific transport door corresponding to the stationary wall, is preferably provided with wheels and may be wheeled in on guides until it sealingly abuts oblique edge surfaces of the stationary wall.

Figure 7:
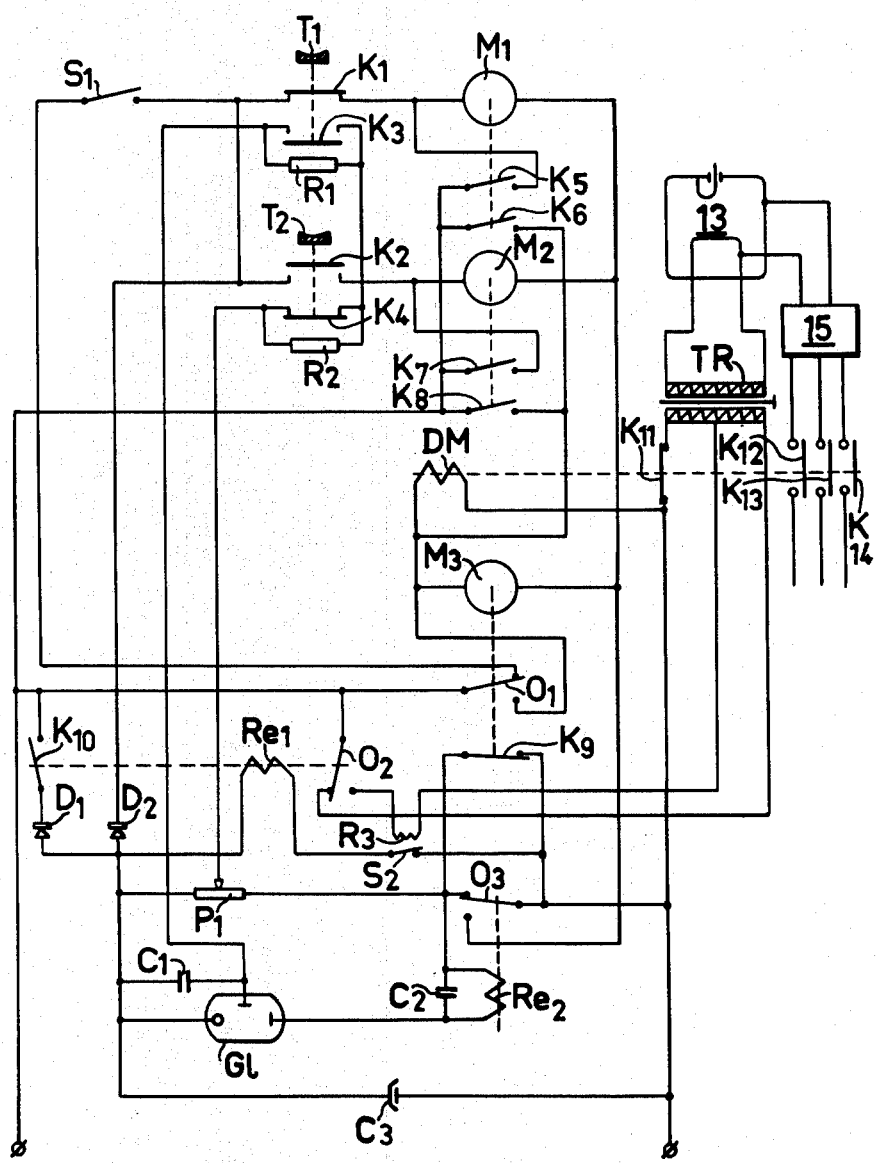
FIG. 7 is a suitable circuit diagram representing electric means in the automat.

In accordance with the invention, the automat is among other things, also provided with means for giving the automat a high readiness for start. FIG. 7 represents a suitable circuit diagram herefore, which relates most closely to the embodiment disclosed in FIG. 1 but which as to its major features could be utilized also in other embodiments, e.g., according to FIGS. 4–6. The circuitry according to FIG. 7 comprises an electric motor M1 for a feeding out and tape cutting means, a pull magnet DM (18 in FIG. 1) for the shutting of a spring biased oven door (16 in FIG. 1), an electric motor M3 (29 in FIG. 1), inter alia for the transport of the articles within the oven. The meaning of other designations utilized in the following is supposed to be evident from the following specification and FIG. 7 which represents normal starting condition. M2=an electric motor for another, alternative feeding out and cutting off means for a tape containing articles of another kind. D1 and D2=diodes, TR=a filament current transformer.

T1 and T2=push buttons for motors M1 and M2 respectively.
S1 and S2=switches.
K1 . . . K14=contacts.
R1, R2, R3=resistors.
G1=glow lamp.
P1=potentiometer.
C1, C2, C3=capacitors.
O1, O2, O3=switches.

Transformer TR is through contact K11 and switch 02 connected in such a way, that it supplies a current which is suitable for maintaining a pre-temperature of the generator cathode. When a coin is introduced, this temporarily closes switch S1 (for at least 10 seconds, for example by any conventional coin-operated delay-opening relay customarily used in such circuits), with the consequence that diode D2 has current applied to it through switches 01 and S1 and charges condenser C3 and energizes both potentiometer P1 via switch 03 and relay Re 1 which is connected through bimetal switch S2. This means that holding contact K10 is closed to keep the relay energized when switch S1 subsequently re-opens, and that the relay switching contact 02 is transferred rightwardly so that transformer TR is interconnected through resistor R3 to supply a current suitable for maintenance of the operating temperature of the cathode. Simultaneously condenser C1 is becoming charged through potentiometer P1 and resistor R1, and after the time required for the heating of the cathode to its operating temperature, about 10 seconds, condenser C1 has reached such a voltage, that the glow lamp G1 is lighted thereby. When this occurs, the current through the lamp energizes relay Re 2 which downwardly transfers its switch contact 03, which means that motor M1 is supplied with current through switches 01, S1, K1 and 03. Therefore, motor M1 advances and knife 10 (FIG. 2) detaches a portion from the tape in one second and motor M1 then closes contacts K5 and K6 by means of a cam. Contact K5 makes the motor independent of switches S1, 01, and T1, and contact K6 applies current to electromagnet DM and motor M3 via relay switches 03. This means that magnet DM introduces the portion into the oven and shuts the door of the oven and closes contacts K12–K14 and opens contact K11. Contacts K12–K14 apply anode voltage to the generator, and contact K11 disconnects filament transformer TR, since the generator does not need special cathode heating during operation. Motor M3 instantly transfers switch 01 downwardly by means of a cam, so that electromagnet DM and motor M3 become independent of switches S1, T1 and K6, and advances the portion slowly within the oven to equalize the temperature thereof. After half a revolution, motor M3 opens contact K9 by its cam with the consequence, that lamp G1 is extinguished and switch 03 is reset upwardly at a slight time later since relay Re 2 has its return delayed by condenser C2. The resetting of switch 03 by relay Re 2 causes motor M3 to become free of current and to stop. After a time determined by resistor R1 and condenser C1 the voltage of condenser C1 will, however, fire lamp G1, which causes energization of relay Re 2 and a transfer of switch 03. On account hereof motor M3 starts again and completes its revolution which ends with the upward resetting of switch 01. The resetting of switch 01 stops motor M3 and also interrupts the current supply to electromagnet DM, so that contacts K12–K14 are opened, contact K11 is closed and the door of the oven is opened by the action of the spring. The movement of the door also brings about a feeding out of the portion. The resetting of switch 01 also means that motor M1 instantly receives current through switches 01, S1, T1 and 03 and brings about the advancement and detachment of a new portion and a repetition of the cycle, if switch S1 should have been actuated through the introduction of a new coin. If a new coin should not have been inserted during the cycle, the structure stops with relay Re 1 standing actuated and transformer TR supplying current for maintaining the cathode of the generator at operating temperature. The structure will rest in this position until the current of transformer TR through resistor R3 has had time to cause such a heating of switch S2, which is a bimetal contact, that it is opened. The opening of switch S2 also means that relay Re 1 is de-energized and opens contact K10 and transfers switch 02 for the smaller current from transformer TR. The opening of contact K10 also disconnects the voltage from condenser C3, and everything returns to the status according to FIG. 7.

The mode of operation described means, in a period of strong demand, that the first portion is delivered after 10 seconds+heating time for the portion, and that all succeeding portions are delivered after heating time solely, and that this can be obtained without such expensive wearing out of the cathode as is occasioned when the generator cathode is permanently maintained at working temperature. The two buttons T1 and T2 are mechanically interlocked. Furthermore, they are each adapted to govern one individual motor M1 and M2 respectively and one individual resistor R1 and R2 respectively. This means, that every button may represent a specific article, which is always advanced by one and the same motor, and that this article may have a specifically proportioned heat treatment time, determined by the resistor R1 or R2 respectively. Of course, more than two such buttons T with appurtenant motor and resistor may be provided but this does not affect the remainder of the structure. In order to reduce the time from the manual operation (insertion of a coin) mentioned above to the delivery of the article, the apparatus may be organized in such a manner, that the article is separated from the tape already at the end of the preceding cycle.

It is also within the scope of this invention to secure the above mentioned relative movement between the portion of food and the micro-wave field by means of rotating or movable reflectors for the micro waves. Such reflectors may be arranged within the oven adjacent to its ceiling.

While the invention has been particularly shown and described with reference to some preferred embodiments thereof, it will be understood by those skilled in the art that various changes in form and details may be made therein without departing from the spirit and scope of the invention.

What I claim is:

1. In an automat for heat treatment and delivery of articles of food, the improvement comprising:
   an oven for heat treatment of said articles by microwave irradiation,
   means including a cathode for generating a field of microwaves to effect said irradiation,
   means for heating said cathode to a working temperature, at which said field is generated, from a substantially lower temperature in a given time,
   delivery means for delivering a said article into said oven for heat treatment therein and then out of the oven for use, and
   means for maintaining said cathode at said working temperature, after said delivery out of the oven, for an interval greater by a multiplicity of times than said given time, and
   means operative upon the demand of a said heated article for (a) operating said heating means and then said delivery means after said given time, if said cathode is at said lower temperature when the said demand is received, or (b) operating said delivery means immediately if said interval is existing, so as to preclude the necessity of heating the cathode to said working temperature for demands occurring during said interval.

2. Apparatus as in claim 1 wherein said generator is a magnetron and said interval is approximately 2–3 minutes.

3. Apparatus as in claim 1 including means operative at the end of said interval to reduce said working temperature to said lower temperature which is an operation readiness temperature sufficiently low to prevent wear of the cathode but sufficiently high to enable its heating to said working temperature in said given time which is shorter than the time of heat treatment of a said article.

4. Apparatus as in claim 1 including a heat insulated container for a supply of said articles, said delivery means cooperating with said container in such a way that all articles are held in said container during periods of no demand.

5. Apparatus as in claim 4 wherein said container has a wall with a feedout aperture and said apparatus includes a movable member of heat insulating material for opening said aperture to feed articles to said delivery means and for closing said aperture during periods of no demand.

6. Apparatus as in claim 5 in which said movable member is a wing-wheel fitting in said opening and having an axis of rotation parallel to said one wall, and a packet between adjacent wings fitted to the articles, which are mutually alike, said wing-wheel being constructed to fit to the lateral edges of said opening with at least two wings.

7. Apparatus as in claim 1 wherein said working temperature maintaining means includes a delay switch coupled to said heating means.

8. Apparatus as in claim 7 including:
   means for normally keeping said cathode at said low temperature during periods of no demand,
   a timer having a runout of said given time,
   said operating means being effective in its said (a) function to switch the cathode from said keeping means to said heating means and to start said timer,
   means coupled to said timer for causing an article to be fed to said delivery means at the end of said given time and to cause the delivery means to move the fed article into and out of the oven, and
   means coupled to said timer for causing operating voltage to be applied to said generator at the end of said given time for the period of the heat treatment and for disconnecting said heating means only during that period.

9. Apparatus as in claim 1 including means for effecting relative movement between said articles of food and said microwave field during said heat treatment in the oven.

10. Apparatus as in claim 9 wherein the last mentioned means includes means movable within said oven and forming at least part of said delivery means.

11. Apparatus as in claim 10 wherein said means for operating the delivery means causes a pause in the movement of said movable means in the oven.

12. Apparatus as in claim 10 wherein said means for operating the delivery means causes a pause in the movement of said movable means in the oven for substantially said given time.

References Cited by the Examiner

UNITED STATES PATENTS

| 2,356,976 | 9/1941 | Ford | 99—358 |
| 2,623,451 | 12/1952 | Prohaska | 99—352 |
| 2,632,090 | 3/1953 | Revercomb et al. | 219—10.55 |
| 2,733,650 | 2/1956 | Williams | 99—327 |
| 2,790,379 | 4/1957 | Rothstein et al. | 99—357 |
| 2,831,419 | 4/1958 | Timm | 99—357 |
| 2,841,074 | 7/1958 | Schechter | 99—357 X |
| 2,901,964 | 9/1959 | Johnson | 99—357 |
| 2,965,015 | 12/1960 | Huchok | 99—357 X |
| 2,990,973 | 7/1961 | Chazen | 99—357 X |

ROBERT E. PULFREY, *Primary Examiner.*

JEROME SCHNALL, LAWRENCE CHARLES,
*Examiners.*